United States Patent [19]
Vere et al.

[11] Patent Number: 4,595,815
[45] Date of Patent: Jun. 17, 1986

[54] PROCESS AND INSTALLATION FOR WELDING GRIDS FOR NUCLEAR FUEL ASSEMBLIES

[75] Inventors: Bernard Vere, Eybens; Paul Mathevon, Bollene; Jacques Le Pargneux, Lyons, all of France

[73] Assignee: Cogema et Framatome, Velizy Villacoublay, France

[21] Appl. No.: 550,151

[22] Filed: Nov. 9, 1983

[30] Foreign Application Priority Data

Nov. 9, 1982 [FR] France ................................ 82 18800

[51] Int. Cl.⁴ .......................... B23K 9/225; B23K 9/32
[52] U.S. Cl. .................................. 219/58; 219/125.1; 219/159; 219/56
[58] Field of Search ................... 219/56, 57, 58, 125.1, 219/158, 159; 376/432

[56] References Cited

U.S. PATENT DOCUMENTS 3,547,334 12/1970 Gwyn, Jr. .......................... 219/57 X
4,111,348 9/1978 Laird ..................................... 228/181
4,221,319 9/1980 Paice .................................. 219/56 X

FOREIGN PATENT DOCUMENTS 2364729 4/1978 France.

Primary Examiner—Roy N. Envall, Jr.
Assistant Examiner—Catherine M. Sigda
Attorney, Agent, or Firm—Pollock, Vande Sande & Priddy

[57] ABSTRACT

For welding a grid formed by sets of plates disposed orthogonally and whose endmost parts are secured to a surround, it is placed in a shaping and mechanically holding frame allowing access to the point to be welded. The frame containing the grid is then placed on a revolving device belonging to a roundabout, at a first welding position and welding is carried out therein on at least one face of the grid by means of a welding member movable in two perpendicular directions for bringing it at right angles to each of the welding points on the face. The frame is then brought to a second welding position in which the plates are welded to the surround by means of a second welding member movable in only one direction, after rotation through 90° of the frame by means of the revolving device; and the operations are repeated as necessary until the whole of the welds have been executed.

9 Claims, 15 Drawing Figures

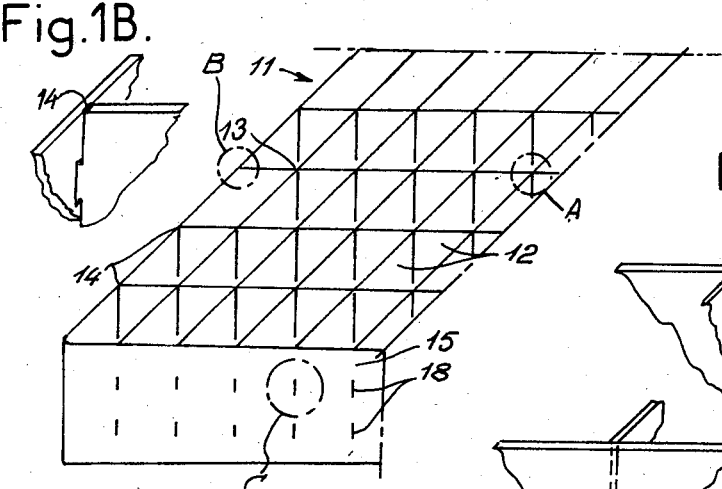
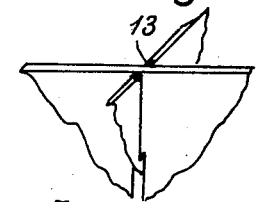
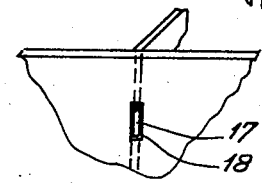
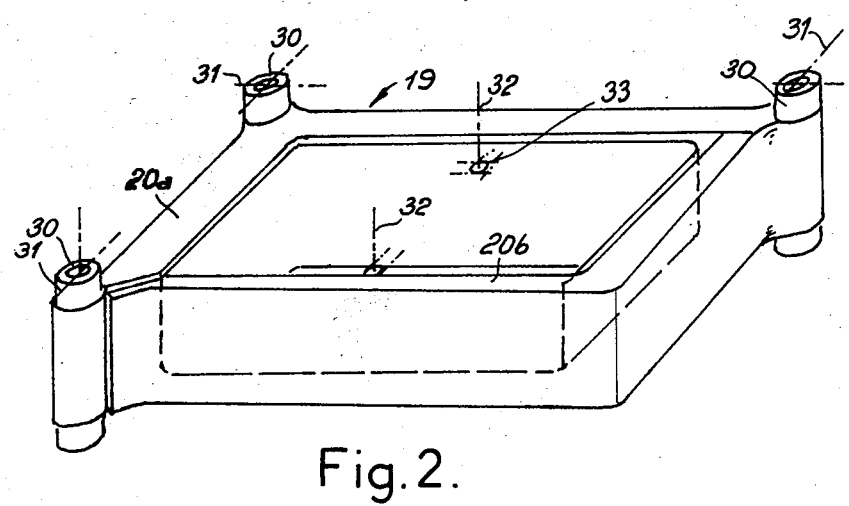

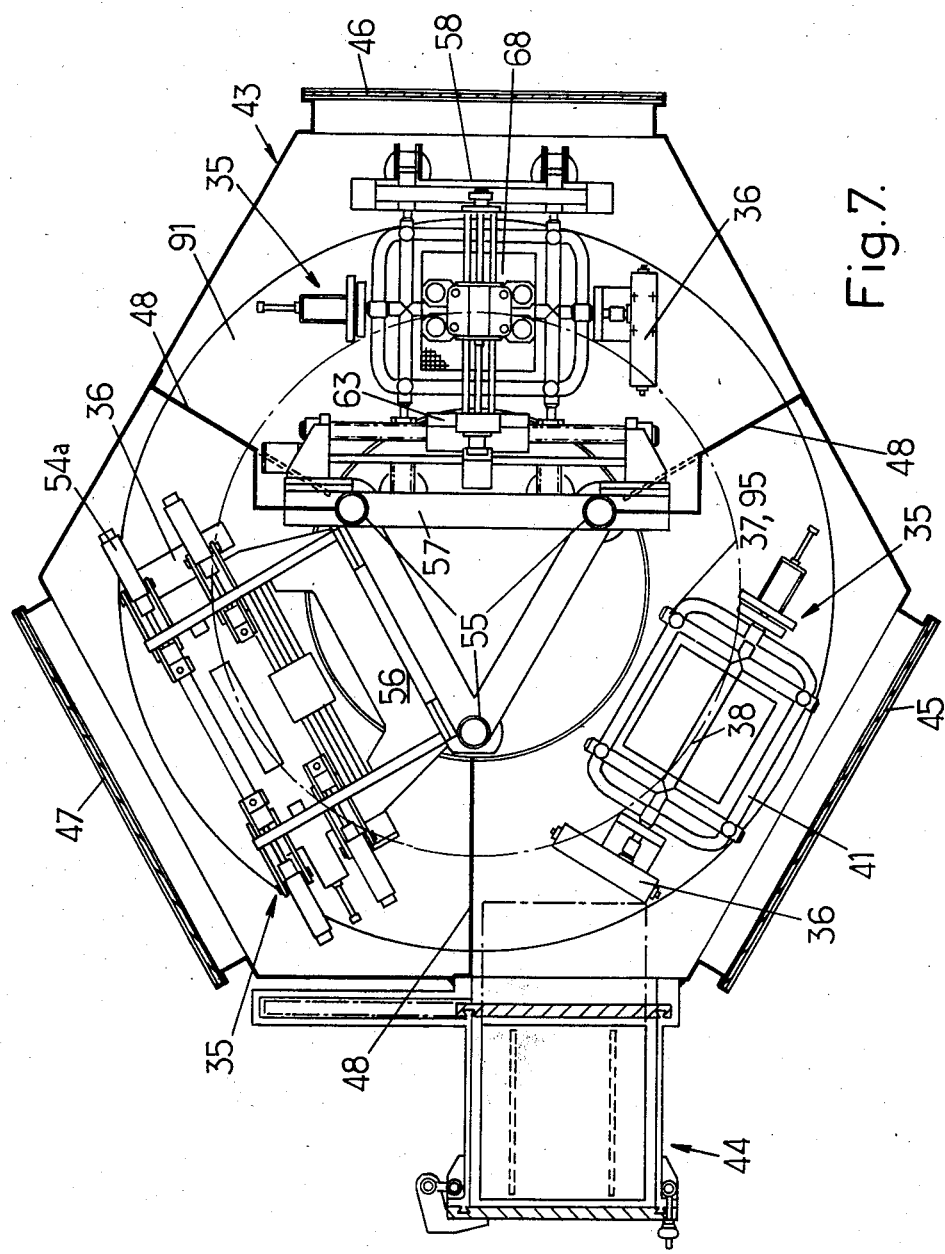

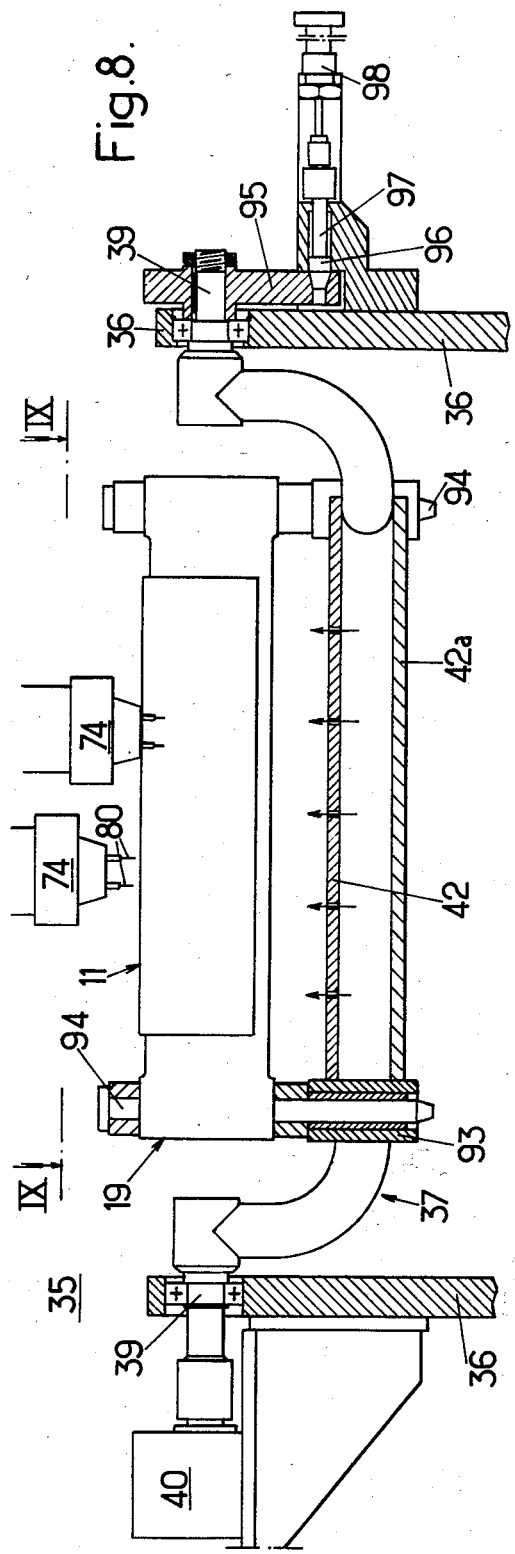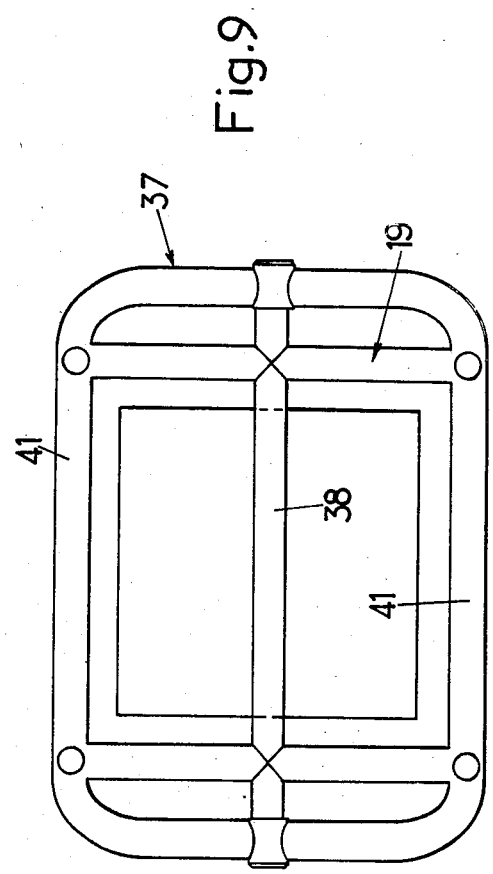

PROCESS AND INSTALLATION FOR WELDING GRIDS FOR NUCLEAR FUEL ASSEMBLIES

FIELD OF THE INVENTION

The invention relates to the manufacture of grids intended to be incorporated in nuclear reactor fuel assemblies. It finds a particularly important application in the manufacture of grids for assemblies whose framework comprises end pieces connected together by tie-rods imprisoned in some of the cells of grids spaced evenly apart along the tie-rods, the other cells of the grids supporting the fuel rods of the assembly.

BACKGROUND OF THE INVENTION

The grids in general comprise two sets of plates disposed in two orthogonal directions and lap-jointed together to define elementary cells which the fuel rods and the tie-rods pass through. The plates are furthermore connected, at their periphery, to a belt having the same form as the plates. To ensure cohesion of the grids, these component parts are connected together at their intersections. This operation is often carried out at the present time by manual brazing, i.e., by a long and tedious operation, which moreover does not guarantee fully satisfactory reproductibility, even if a relative holding jig is used, such as the one described in U.S. Pat. No. 4,111,348, for constructing grids whose plates are cut out so as to form springs bearing on the fuel rods, or in French Pat. No. 2,364,729.

SUMMARY OF THE INVENTION

The invention aims at providing a process and installation for welding together the different component parts of a grid, applicable not only to grids with cut-out spring, but also to those with added spring, allowing the necessary welds to be made in sequence under conditions ensuring maintenance of the parts in place and the absence of stresses likely to deform them. In particular embodiments of the invention, this latter provides compensation of the play due to shrinkage of the metal during the welding operation, allows the operation to be carried out in a protective gas atmosphere and allows completely automatic working. In a preferred embodiment, the welding is carried out entirely in a glove box, at successive stations separated by walls avoiding turbulences of the protective gas, the grids simply assembled being introduced and the welded grids extracted without loss of air tightness.

To this end, the invention proposes a process for welding grids formed by two sets of plates disposed orthogonally and whose endmost parts are secured to a belt, according to which a grid is placed in a frame for maintaining the grid shape and holding it mechanically so as to allow access to points to be welded on the two faces and on the sides of the grid; the frame containing the grid is placed on a revolving device belonging to a mobile roundabout. The frame is brought by means of the roundabout to a first welding position and welding is there carried out on at least one face of the grid by means of a welding member movable in two perpendicular directions so that it may be brought in alignment to each of the welding points of the face; and the frame is brought to a second welding position in which the plates are welded to the belt by means of a second welding member movable in a single direction, after the frame has been rotated through 90° by means of the revolving device; and the operation is repeated as need be until the whole of the welds have been effected.

The invention also provides an installation comprising, in a controlled atmosphere enclosure having an air-lock, a roundabout supporting at least one revolving device which comprises a cradle and which is capable of bringing a mechanical holding frame containing an assembled grid placed on the cradle successively into first and second welding positions, the device having means for changing the orientation of the cradle and of the frame; a first assembly for welding the plates together and to the surround, placed at the first position and comprising a welding member and means for moving it parallel to the grid so as to bring it at right angles to each of the welding points and perpendicularly to the grid between a welding position and a retracted position; and a second welding assembly placed at the second position, comprising a welding member movable in a direction parallel to one of the sides of the grid in the orientation given to this latter by the revolving device, for fixing the plates on end to the surround.

Different welding operation sequences may be adopted, at welding positions which are all different (which implies the presence of more than two positions) or by several operations on different faces and sides at the same positions.

BRIEF DESCRIPTION OF THE DRAWINGS

The invention will be more clearly understood from reading the following description of a particular embodiment, given by way of example.

FIG. 1 is a perspective diagram showing a fraction of a grid to which the invention is applicable;

FIG. 2 is a perspective view of a mechanical holding frame for an assembled grid, usable for implementing the invention;

FIG. 7 is a top view along line VII—VII of FIG. 6;

FIG. 8 shows a revolving device belonging to the installation of FIGS. 6 and 7, in partial section through a plane passing through the revolving axis;

FIG. 9 is a top view of the chassis of the device of FIG. 8;

DESCRIPTION OF PREFERRED EMBODIMENT

Figure 4:
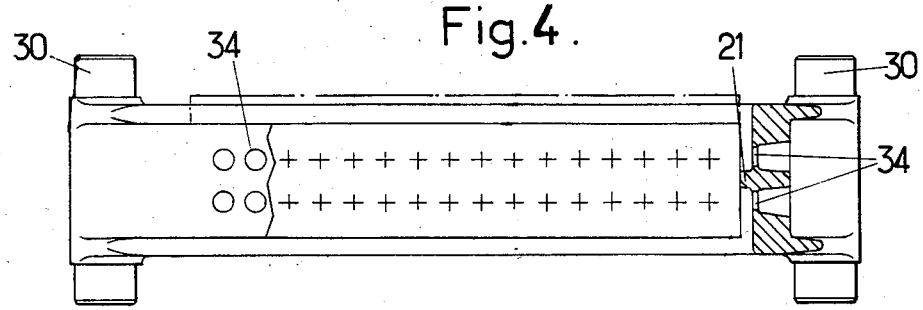
FIGS. 4 and 5 are sectional views of FIG. 3, respectively along lines IV—IV and V—V.
Figure 3:
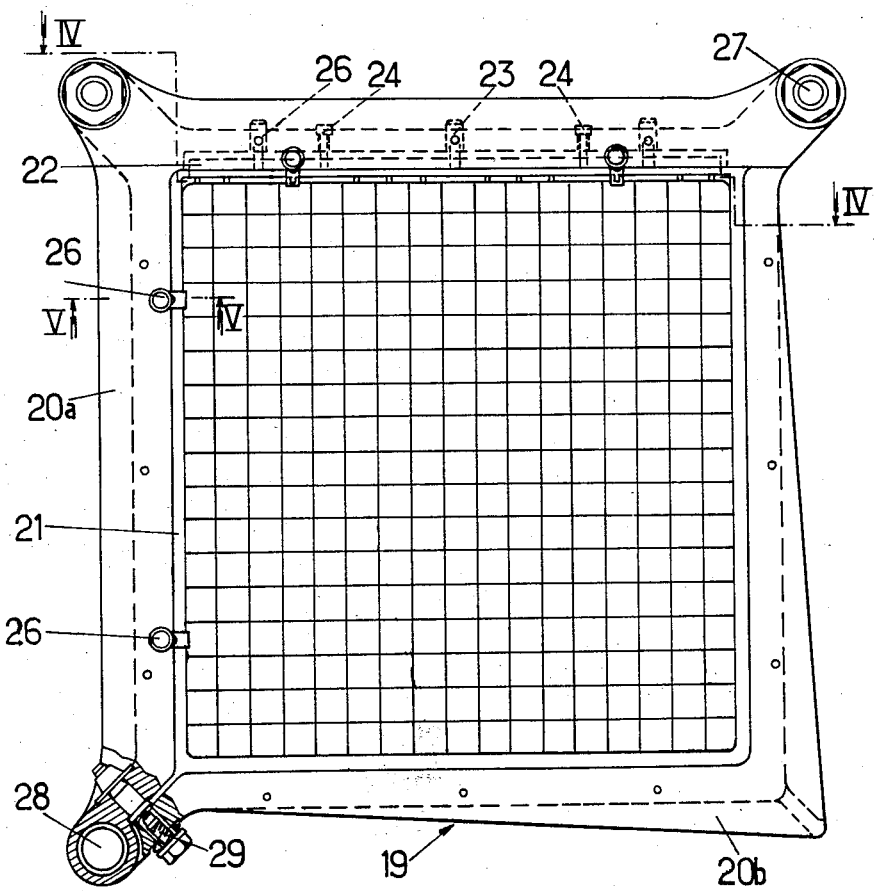
FIG. 3 is a top view of the frame of FIG. 2, containing an assembled grid.
Figure 5:
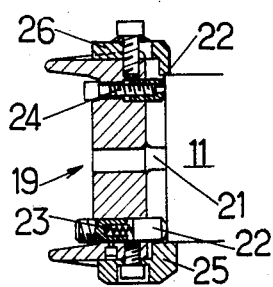

The installation which will be described by way of example is more especially for welding together the component parts of a grid of the kind shown in FIG. 1, which grid may have the detailed construction described in French Pat. No. 2 474 229. This grid 11 comprises two sets of plates 12 disposed orthogonally and lap-jointed together. A securing weld 13, which will be called hereafter "type A weld" and whose detail is shown at A in FIG. 1, secures the plates together at each intersection, on each of the two large faces of grid 11. The edges of plates 12 form with surround 15 a T shaped intersection which receives a weld 14 on each face, which weld will be qualified as of "type B" hereafter.

Plates 12 comprises at their ends tenons 17 which engage in mortises 18 formed in the surround. The tenons, some of which may be deformed so as to provide mechanical locking, are welded to frame 15 at points spaced apart. The welding thus effected on edge will be called "of type C".

The installation which will now be described allows the different types of welding required to be carried out under good conditions, with an accuracy guaranteeing reliability and in a controlled atmosphere enclosure avoiding any pollution likely to cause subsequent corrosion.

So that the welding of the components of the grid may be carried out while they are in a correct relative position, the assembled grid is first of all positioned in a frame for truing up the assembled grid, if that is necessary, then for holding the component parts of the grid in a well defined position and, finally forming an assembly which may be manipulated in the installation and brought into all the orientations required for welding.

The frame 19, shown in FIGS. 2 to 5, comprises two rigid right-angled brackets 20a and 20b for imprisoning the surround 15. Each right-angled bracket is provided with a row of bosses 21 (FIGS. 3 and 5) for bearing on the surround 15, placed at right angles to the plates. In the case of a grid of the kind shown in FIG. 1, where each plate is provided with two tenons 17, the bosses situated half way up the height of the surround free the spaces requires for carrying out welds of type C. Bars 22 supported by the right-angled brackets are urged, by springs 23 bearing on stop screws, towards the surround. These bars are placed in the immediate vicinity of the high and low parts of the surround. Because of the resilience of the springs, they allow compensation for the play due to shrinkage during execution of type A welds. The return springs 24 overcome the effect of springs 23 when a grid is mounted in a frame.

At the lower part of each right-angled bracket is permanently fixed a flange 25 which defines a reference plane for positioning in height the grid 11 to be held. The top part of each right-angled bracket is provided with threaded holes, or other means for removably fixing a mobile flange 26 for securing the grid in the frame, in the axial direction.

Brackets 20a and 20b are provided for connection together by the ends of their arms. For that purpose, the ends of the arms of brackets 20a carry two hollow shafts 27 and 28. These shafts are adapted to be centered in bores provided in the other bracket 20b. A screw 29, bearing on bracket 20b through a resilient washer, may be screwed to a greater or lesser extent into a threaded portion provided for this purpose in the bracket.

Three centering sockets 30, formed by a hollow shaft, are mounted in bores formed at the top and at the end of the two arms of bracket 20a. These sockets are floating, but are connected to the bracket by a nut. Once locked, they form an indexing reference for the intersections of plates 12 of the grid during welding.

The positioning and possible rectification of the shape of grid 11 take place in the following way: the grid, assembled for example by means of the installation described in French Patent Application No. 82 15662, is placed in the frame, with flange 26 removed and screws 24 loosened, then flange 26 is positioned. The frame containing the grid is placed on a dummy (not shown) defining three reference axes 31 for sockets 30, then floating. The dummy comprises two indexing fingers 32, shown with broken lines, for cooperating with two pockets 33 of the grid intended to receive tie-rods. The indexes 32 provide accurate positioning of the two sets of plates forming the grid, held resiliently in the frame by tightening the screws 24. Once the indexing of the two pockets 33 has been carried out, the nuts of sockets 30 are tightened so as to lock them onto bracket 20a.

For carrying out C type welds, the brackets comprise, on the faces cooperating with surround 15, as many holes 34 as there are tenons 17 to be welded. These holes have been shown solely in FIG. 4.

The welding assembly is placed in a glove box 43 with port-holes 45,46,47 equipped with handling gloves and each placed facing one of the work posts.

The welding installation may be regarded as comprising an assembly formed by a fixed infrastructure and the welding apparatus which it supports and a roundabout for moving the grids to be welded along a circular path.

The fixed infrastructure comprises a welded frame 49 fixed to the ground, on which a glove box rests. In this latter, transparent vertical screens 48 separate the work positions and limit the turbulences of the inert atmosphere. Frame 49 comprises upper beams 50 which support a fixed plate 51, forming a work floor. To the plate is fixed a circular running track 52 cooperating with the roundabout. Plate 51 also carries, either directly or by means of a framework, different control members which will be described further on.

The roundabout comprises on its side a thick base 91 in the form of a ring which supports three identical revolving devices 35 placed at equal angular intervals (this number not being limiting and corresponding, in the present case, to the number of work positions). The lower part of base 91 is provided with a toothed ring 92 which meshes with a pinion fixed on the shaft of a drive motor 53 belonging to the fixed infrastructure. This toothed ring is adapted to rotate along the circular running track 52 under the action of the motor 53 whose shaft passes sealingly through plate 51. Between the chassis of each revolving device, formed by a right-angled bracket, and base 91 is placed a vibration absorber (block of rubber, for example) which further allows slight deflection of the device during fine indexing adjustment of the revolving system, carried out at the work position.

Each revolving device 35 comprises a chassis 36 fixed to base 91 by means of the vibration absorber, provided with bearings defining a horizontal rotational axis for a frame receiving cradle 37. This cradle 37 (FIGS. 8 and 9) comprises a bent central tube 38 connected to swivel pins 39 rotatably mounted in the bearings of chassis 36. One of the swivel pins 39 is tubular so as to form an inert gas intake, and it communicates with the central tube 38. The other swivel pin 39 is connected to a rotational driving member 40 formed advantageously by a rotary argon piston and cylinder device. Cradle 37 is completed by lateral tubes 41 connected to the central tube 38 so as to receive the argon entering through the swivel pin. The assembly of tubes thus forms a reception cradle retaining the frame. Holes formed in tubes 38 and 41 allow the inert gas to escape under the grid to be welded, as shown by the arrows in FIG. 8. A plate 42 made from a porous material (e.g., sintered stainless steel) may be interposed between the cradle and the frame so as to cause homogeneous diffusion of the inert gas over the whole surface of the grid. A solid plate 42a closes the cradle 37 at the bottom and limits inert gas leaks, which gas will in general be argon.

To provide centering of frame 19, and so of the grid, on the cradle 37, this latter is provided with three rings 93 each of which is intended to receive a centering pin 94 also fitted into the corresponding socket 30 of frame 19.

Finally, the revolving device is provided with means for angular indexation of the cradle in at least two positions at 90° from each other. In the embodiment illustrated in FIG. 8, the indexing means comprise a semi-circular plate 95, fixed to the hollow swivel pin 39 and provided with frusto-conical indexing holes 96 in number equal to the number of angular work positions of the cradle. Three holes for example may be provided, the middle hole corresponding to the position of the cradle shown in FIG. 8.

Holes 96 are provided for receiving an indexing and locking finger 97 controlled by a double acting piston and cylinder device 98 carried by the chassis of the revolving device 35. Actuation of the piston and cylinder device 98 provides indexing of plate 95 and so of the cradle and the subsequent maintenance of the cradle in the suitable position.

The roundabout supporting the revolving devices 35 allows each of them to be brought into three successive work positions. The first position, facing port-hole 45 (FIG. 7) serves for loading the frames containing the grids on to a revolving device 35, then for withdrawing the frames. The second position, facing port-hole 46, serves for carrying out welds of types A and B. The third position, facing port-hole 47 is for carrying out welds of type C.

Figure 6:
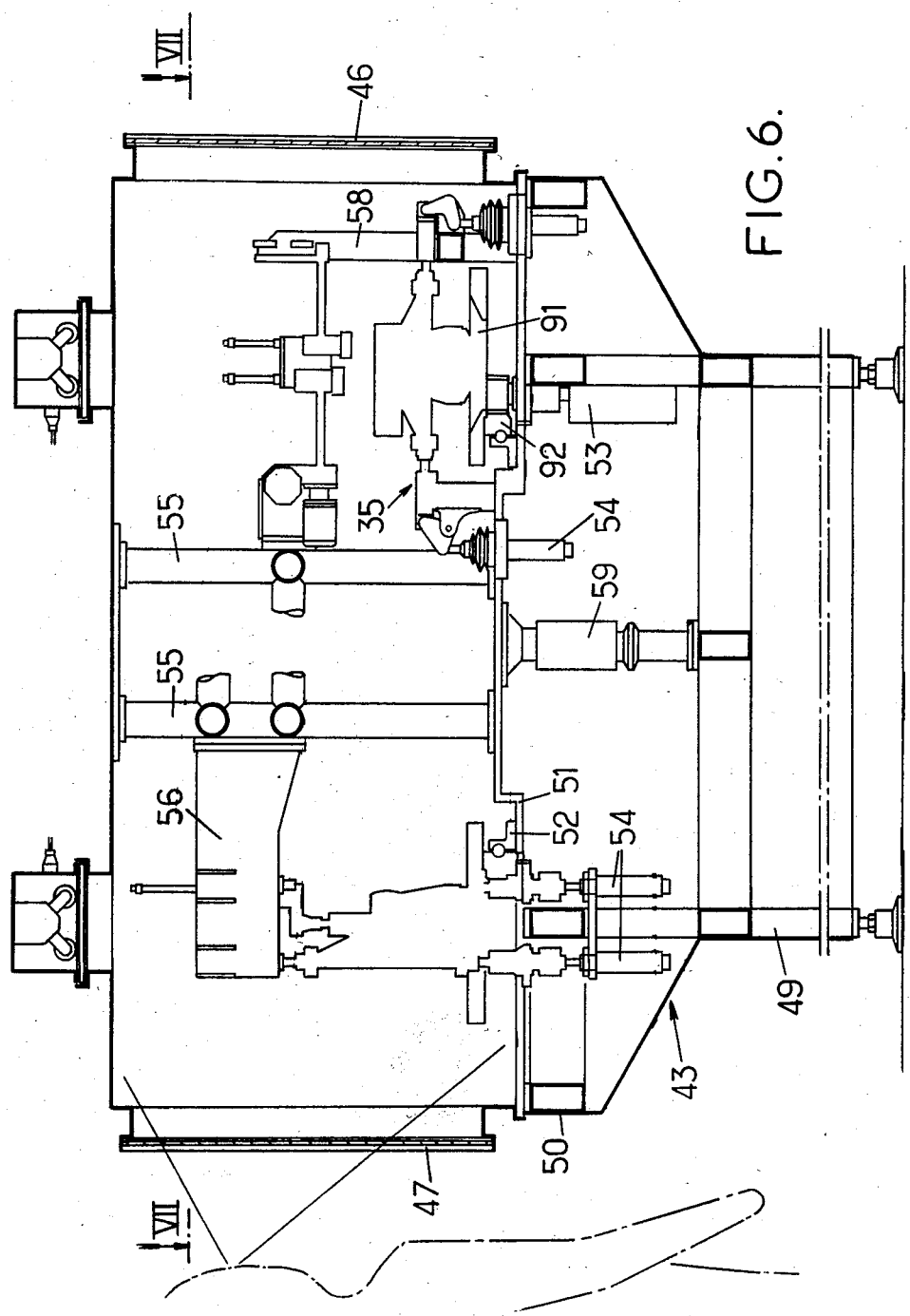
FIG. 6 is an elevational view in partial vertical section showing the whole of an installation according to one particular embodiment of the invention.
Figure 10:
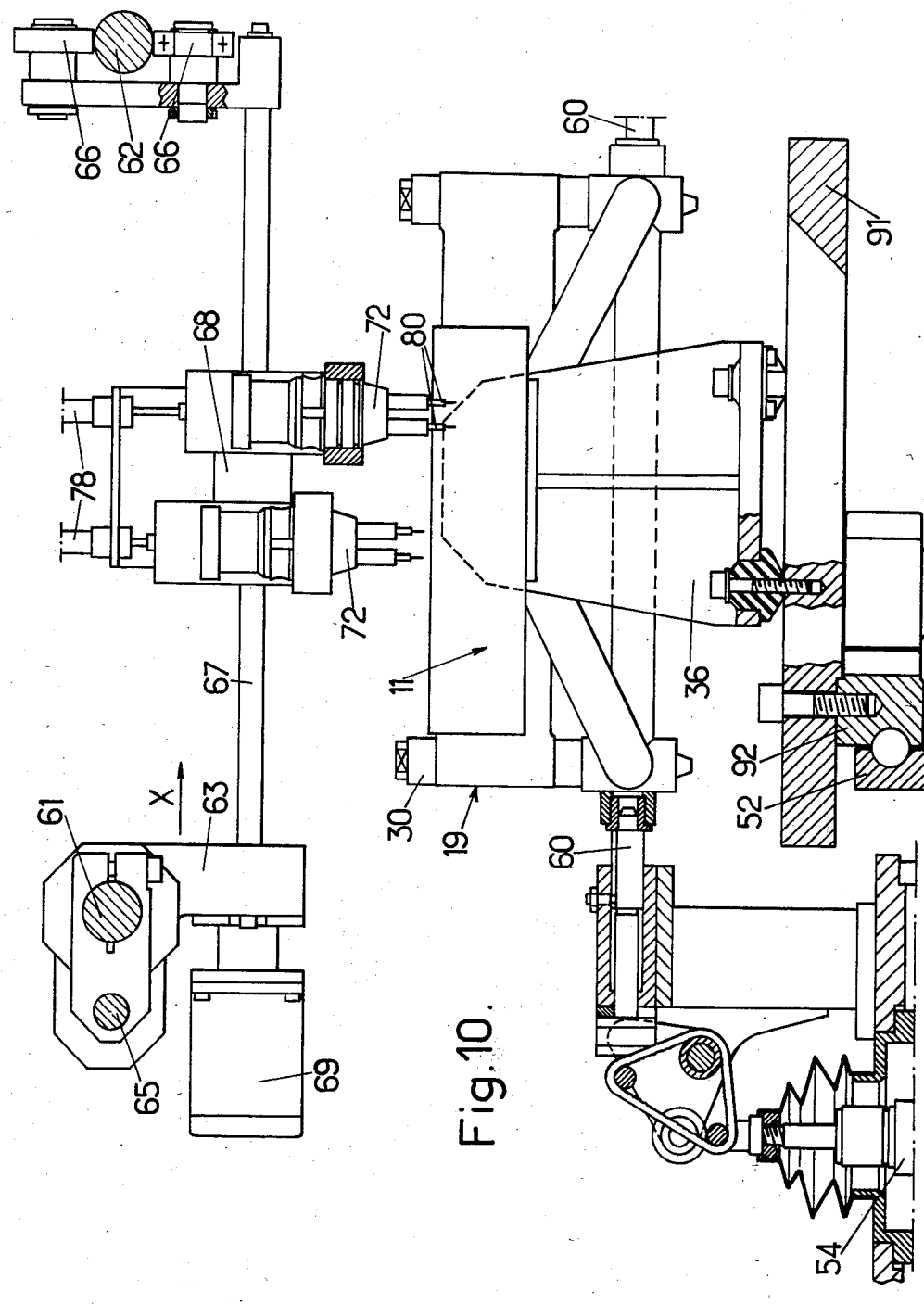
FIGS. 10 and 11 show, respectively, in section through a vertical plane and in a top view, the welding assembly for welding the plates together and to the surround on each of the two large opposing faces.

The welding installation properly speaking, shown in FIGS. 6,7 and 10 is placed in the glove box 43 comprising an introduction air-lock 44. Plate 51 carries, at each of the welding positions, piston and cylinder devices 54 whose rod is connected by a linkage to indexing fingers 60 which engage in rings fixed to the cradle 37 and hold this latter in an accurate position, serving as reference for the welding members. Bellows provide sealing for the rods of these piston and cylinder devices (FIGS. 6 and 10) passing through the plate. The plate also carries, in its central part, three columns 55 which are spaced evenly angularly apart and are connected to the ceiling of the glove box. These three columns 55 also support the welding assemblies which will now be described and whose different feed and control circuits pass through the plate through a sealed sleeve 59 (FIG. 6).

In the first welding position (FIGS. 6,7,10 and 11), a fixed horizontal bracket 57 connects together two of the columns 55. Parallel to this bracket is disposed a vertical framework 58. Bracket 57 and framework 58 support parallel running tracks for the assembly which will form welds of types A and B on the large faces of the grid.

This welding apparatus comprises a carriage 68 on which the welding torch (or torches) is mounted vertically movable by means which will be described hereinbelow. This carriage is movable in two orthogonal directions X and Y so that a welding torch may be brought at right angles to each of the welds to be carried out on the grid, held in a horizontal position by the revolving device 35.

The means for moving and guiding along direction Y comprise two horizontal and parallel shafts 61,62, one being fixed to the columns 55 which carry the bracket 57 and the other to the framework 58. On shaft 51 there is slidably mounted, by means of ball sockets, a carriage 63 provided with slides 67 which define the direction X. The movements of carriage 63 are controlled by a mechanism which comprises an electric stepper motor, not shown, which drives the screw 65 of a ball circulation threaded assembly whose nut is integral with carriage 63. The support and guiding of carriage 63 are completed by shaft 62, imprisoned between two rollers 66 carried by the carriage 63 (FIG. 10).

Figure 11:
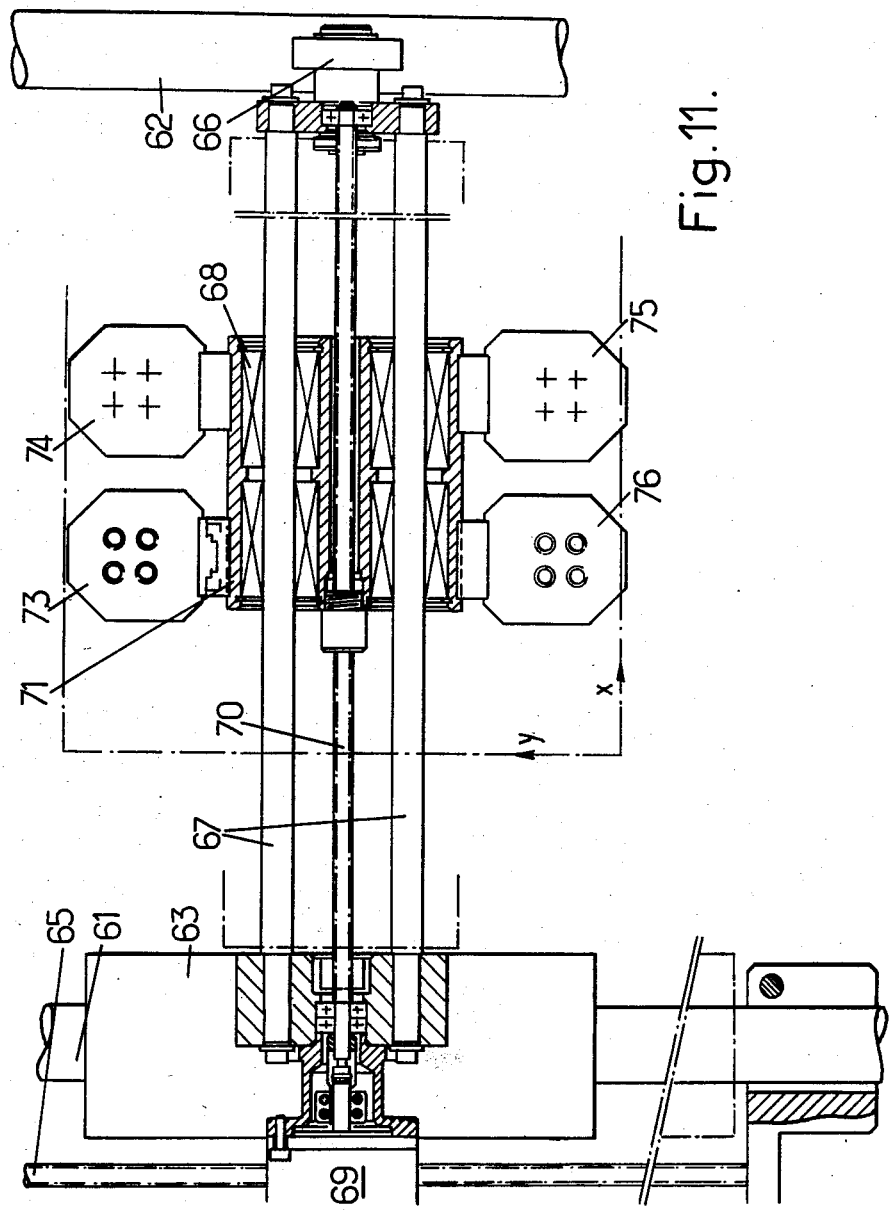
Figure 12:
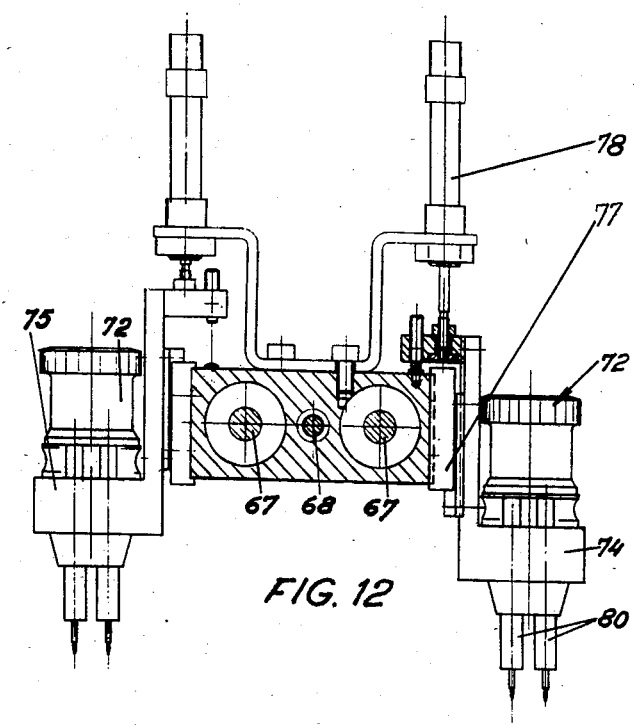
FIGS. 12 and 13 are sectional views through a vertical plane, showing respectively a torch moving carriage and a torch support belonging to the assembly of FIGS. 10 and 11.

Carriage 68 is guided on slides 67 by four ball sockets 71 (FIG. 11). The mechanism for moving this carriage in direction X comprises a ball threaded connection formed by a screw 70 which engages in a tapped socket integral with the carriage and an electric stepper motor 69 driving the screw 70.

In the embodiment shown by way of example in the figures, carriage 68 carries four welding torches 72, each having four electrodes. These torches are intended to effect TIG electric welding (in an inert gas protective atmosphere, without filler metal). The four electrodes carried by the same torch are adjustable in height independently and are fed independently, which allows great flexibility in use. But numerous variations are possible, and moreover, the welding may be carried out by other procedures.

Each of torches 72 is fixed to a table 73,74,75 or 76 movable vertically over rails 77 carried by the carriage 68. A piston and cylinder device 78 associated with each table allows it to be moved vertically between a low welding position and a high position in which it is freed from the grid to be welded.

Figure 13:
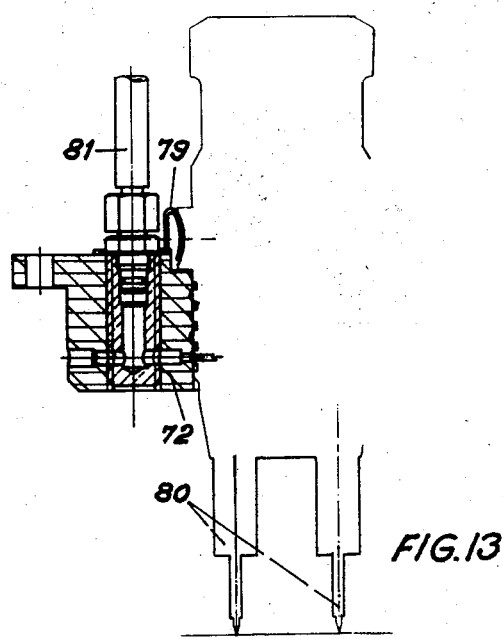

The electric power supply may be provided, for each electrode 80, by a spring 79 which at the same time holds torch 72 (shown in broken lines in FIG. 13) on a fraction of the table formed from an electrically insulating material. Current may be fed to the spring by tube 81 bringing inert gas to the electrode 80. The endmost part of tube 81 is fixed, by means of a nut which also retains spring 79, to a connection pierced with a passage for feeding inert protective gas to the electrode. The spacing between two adjacent electrodes of the same torch corresponds to the pitch for carrying out type A welds on the grid or to a whole number multiple of this pitch.

Figure 14:
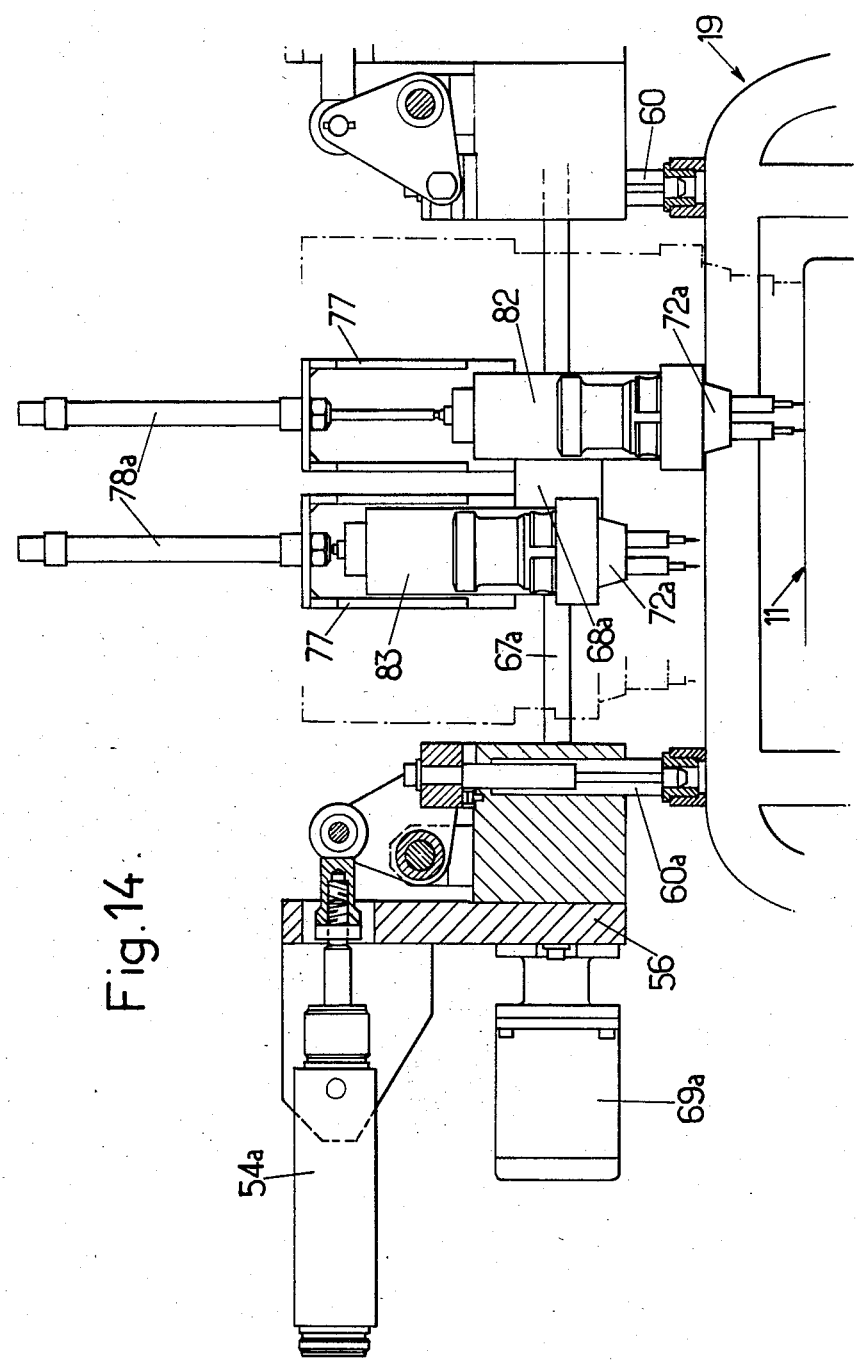
FIG. 14 is a vertical sectional view of the assembly for welding the ends of the plates to the surround, on the sides of the support.

In the second welding position (FIGS. 6,7 and 14), in which type C welds are effected on the edges of the grids after being rotated through 90° by device 35, it is sufficient for the welding assembly to allow a welding torch 72a to be moved along the surround, providing that the torch comprises as many electrodes as there are lines of tenons on the grid The welding assembly is then simpler than in the first position, since it is sufficient to move the torch or torches in direction X parallel to the surround.

The assembly shown in the figures comprises a carriage 68a which, like carriage 68, slides on slides 67a, but these slides are fixed directly to a bracket 56 connecting together two columns 55, instead of being carried by a carriage movable in direction Y. The movements of carriage 68a are controlled by a stepper motor 69a, as in the case of the assembly for carrying out welds of type A and B. Carriage 68a is provided with two tables 82 and 83 having vertical moving means 78a identical to those of the first assembly. The indexing fingers 60a controlled by cylinder 54a are this time placed so as to retain the cradle in a 90° orientation from the one it has in the first welding position.

Several sequences may be contemplated for carrying out the whole of the welds required on a grid in the installation which has just been described. It will however be advantageous to proceed as follows.

The assembled grid 11 is placed in frame 19 and this latter is mounted on a dummy. The upper flange is positioned. Screws 24 are screwed in so as to apply bars 22 against the surround. The assembly thus formed is mounted on a dummy so as to check that the grid is not buckled, by using as references two pockets 33 is which the indexes 32 engage. If required, the grid is trued by action on screws 29, then the nuts of the centering sockets are locked to secure these sockets against movement in their bores. The frame is removed from the dummy, then introduced into the air-lock 44 of the glove box. This latter is partially evacuated, then supplied with an inert gas (normally argon). The frame equipped with its grid is placed on the revolving device 35 disposed with the horizontal cradle facing the port-hole 45, as shown in FIG. 7. Pins 94 are positioned for securing the frame against movement on the cradle (FIG. 8). The roundabout is rotated through 120° so as to bring the revolving device 35 to the first welding position (on the right of FIG. 7). Then type A and B welds are effected, following a prerecorded program implemented by a robot placed inside the glove box. The progression used is preferably in a spiral and chosen so as to minimize deformations due to weld shrinkage. Each torch 72 effects a part of the spot welds before retracting to allow another torch to continue the operation.

Figure 15:
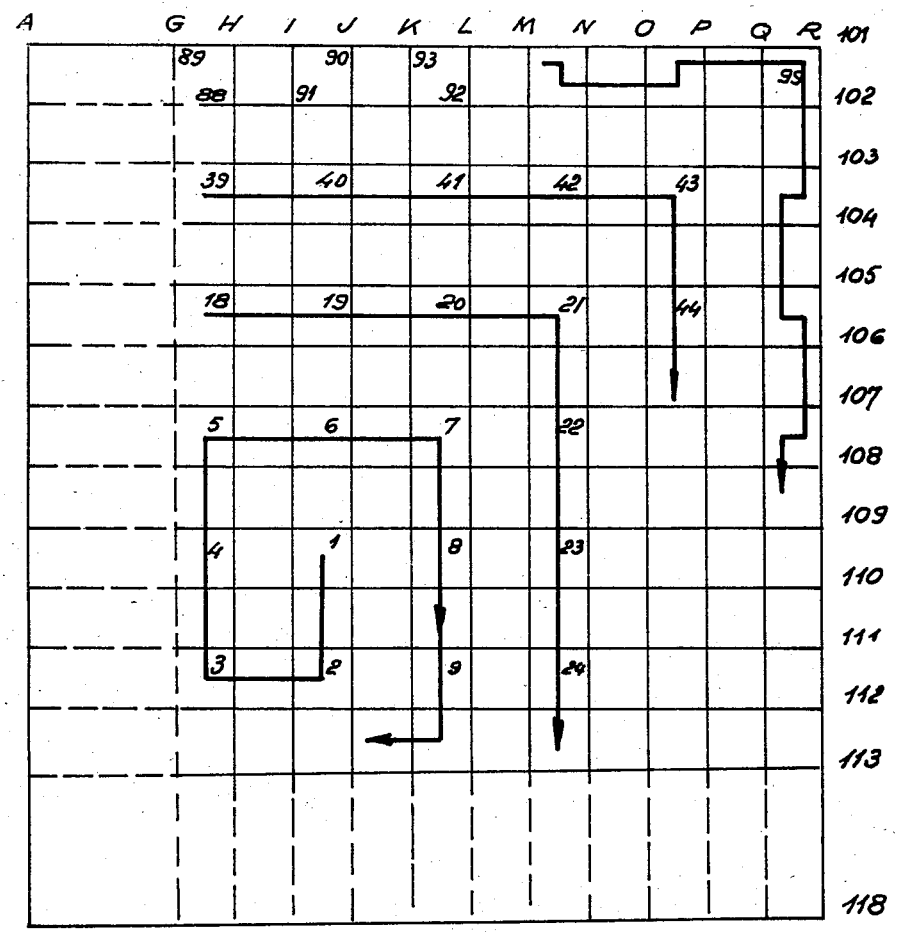
FIG. 15 is a diagram showing a sequence of welding steps.

FIG. 15 shows one example of spiral progression provided for this purpose and adapted for a grid with 17×17 pockets. The position of each weld is indicated by a letter in abscissa and a number in ordinates, and the figures in the pockets indicate the successive positioning points of the table carrying the electrodes which are used for the welding.

Table 73 is first of all brought to the center of the grid, at the position indicated by reference 1 in FIG. 15. The four electrodes carried by table 73 are then supplied, after table 73 has been lowered, to carry out A welds at I 109, I 110, J 109 and J 110. The motor is controlled to move carriage 68 by two steps, so as to bring table 73 to the position indicated by reference 2. Electrodes 80 are then brought down and welds at I 111, I 112, J 111 and J 112 are effected.

The electrodes carried by table 73 will be used as far as position 19. Then, from position 20, the welds are effected by table 74 which will in its turn stand aside at the position referenced 39. Table 75 will effect the welds at positions 40 to 71 and table 76 the welds at positions 77 to 118.

It can be seen that all the tables except table 76 carry out welds at twenty positions, this number is less than that possible with the same electrode without having to take action with regard to this latter. Table 76 must on the contrary carry out a number of welds less than 20 but, at each operation, only some of the electrodes come into action. In fact, for welding the peripheral surround 15 two or even only a single electrode are actuated for a given position of the table. Moreover, since the dimensions of the peripheral cells may be slightly different from those of the inner cells, it may be necessary to effect movements which are not exactly of two steps, as well as movements less than one step.

Once the A and B type welds have thus been carried out on one face, the roundabout is rotated to present the cradle at the second welding position. The revolving device is rotated so as to present one of the sides of the cradle to the welding assembly. The complete series of welds C is carried out on the side of the grid, then the revolving device 35 is actuated to rotate the cradle through 180°. The welds of the side face opposite the one which has just been welded are then carried out. Then, a 90° rotation of the device is provided so that the grid is horizontal, in its original position. The roundabout is rotated to present the grid at the loading and visual control post. Then, if the glove box only contains three positions, as in the case illustrated, the frame and the grid are turned over, by means of the gloves provided in the port-holes, to present to the welding assemblies the horizontal face and the sides not welded during previous sequences.

An installation is thus provided which ensures accurate mechanical maintenance of the grids during welding, without stress likely to deform the parts, allows a welding sequence limiting shrinkage and deformation and compensating for the play which results therefrom, the turbulences of the protective gas being limited by the presence of screens.

We claim:

1. A process for forming grids comprising two sets of mutually orthogonal metal plates whose endmost parts are secured to a surrounding metal belt by electrically welding said plates to each other and to said belt, comprising the steps of
    (a) assembling two sets of plates and a surrounding belt into a grid;
    (b) locating said grid in a frame for putting said grid into shape and for holding it mechanically, said frame being constructed for allowing access to points to be welded on two larger faces and at least two opposite narrower sides of said grid;
    (c) placing said frame containing said grid on a device carried by a carrousel for rotation about an axis transverse to an axis of said carrousel;
    (d) moving said carrousel for bringing said frame to a first welding position;
    (e) welding said plates together on at least one of said larger faces of said grid with electrical welding means movable in two mutually perpendicular directions which are parallel to said one of said faces, whereby said welding means may be brought into alignment with a plurality of first welding points on said larger face;
    (f) moving said carrousel to bring said frame to a second welding position and rotating said device and frame through 90°;
    (g) welding the plates of at least one of the sets of plates to said surrounding belt with second welding means movable in only one direction; and
    (h) repeating the preceding steps until all welds have been carried out.

2. A process as claimed in claim 1, wherein some of the welding points on said larger faces are located at crossing points of said plates and are welded in sequence along a spiral path, a plurality of welds being carried out at the same time at least in an inner part of said larger face of said grid.

3. An installation for forming grids comprising a metal belt and two sets of mutually orthogonal metal plates whose endmost parts are secured to said belt by welding said plates to each other and to said belts at crossing points thereof and welding projecting lugs of said plates to said belt, said installation comprising, in an airtight chamber having an air lock:

(a) a carrousel;

(b) means carried by said carrousel and constructed to be rotatable about an axis transverse to the rotation axis of said carrousel, said means having cradle means;

(c) a frame constructed to be removably received by said cradle means and to receive one of said grids;

(d) means for rotating said carrousel, whereby said frame may be brought successively to a first welding position and to a second welding position;

(e) rotation means associated with said cradle for changing the angular position of said frame;

(f) a first welding unit for welding said plates while said frame is in said first welding position, comprising a welding gun and means for moving it parallel to said grid and bringing it in front of each point to be welded and perpendicularly to said grid between a welding position and a retracted position; and (g) a second welding unit placed at said second welding position which comprises a welding gun movable in a direction parallel to one of the sides of said grid in the orientation given thereto by said rotatable means for welding said plates to said belt.

4. An installation according to claim 3, wherein each welding unit comprises a plurality of independently actuatable welding electrodes having a spacing equal to that of the welds to be made.

5. An installation according to claim 3, wherein said rotatable means associated with said cradle are provided for giving to said frame angular positions at 90° from each other and are associated with indexing means for immobilizing said frame in predetermined positions.

6. An installation according to claim 3, wherein each of said welding units comprises several welding guns movable independently toward and away from said grid, each gun having a plurality of electrodes for effecting several welds at the same time.

7. An installation according to claim 3, wherein said frame comprises two right-angled brackets whose arms are connectable to each other by adjustable means, said frame being arranged to receive members for centering said frame with respect to said cradle means.

8. An installation according to claim 7, wherein said frame comprises bosses for abutment against said belt in front of the endmost portions of said plates and bars surrounding said bosses and urged resiliently in abutment against said belt.

9. An installation according to claim 8, wherein said frame has access holes at points for welding lugs of said plates in openings formed in said belt.

* * * * *